United States Patent
Truong et al.

(10) Patent No.: US 9,970,540 B2
(45) Date of Patent: May 15, 2018

(54) TRANSMISSION FLUID PRESSURE CONTROL SYSTEMS AND METHODS FOR CONTINUOUSLY VARIABLE TRANSMISSIONS

(71) Applicant: GM Global Technology Operations LLC, Detroit, MI (US)

(72) Inventors: Minh Q. Truong, Commerce Township, MI (US); Bret M. Olson, Whitelake, MI (US); Steven P. Moorman, Dexter, MI (US); Mohamed O. Egal, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 164 days.

(21) Appl. No.: 15/171,016

(22) Filed: Jun. 2, 2016

(65) Prior Publication Data
US 2017/0350503 A1     Dec. 7, 2017

(51) Int. Cl.
| *F16H 59/00* | (2006.01) |
| *F16H 61/00* | (2006.01) |
| *F16H 63/00* | (2006.01) |
| *F16H 61/662* | (2006.01) |

(52) U.S. Cl.
CPC ... *F16H 61/66272* (2013.01); *F16H 61/0021* (2013.01)

(58) Field of Classification Search
CPC ........... F16H 61/66272; F16H 61/0021; F16H 61/66259; F16H 2061/6608; Y10T 477/624

USPC ............................................... 474/28
See application file for complete search history.

(56) References Cited

U.S. PATENT DOCUMENTS

| 15,171 | A | * | 6/1856 | Croasdale | ................ | A21C 5/04 |
|---|---|---|---|---|---|---|
| | | | | | | 222/218 |
| 4,628,773 | A | * | 12/1986 | Itoh | ....................... | B60W 30/18 |
| | | | | | | 474/28 |
| 4,665,775 | A | * | 5/1987 | Nagamatsu | ....... | F16H 61/66263 |
| | | | | | | 474/12 |
| 4,753,627 | A | * | 6/1988 | Kawamoto | ............... | F16H 9/12 |
| | | | | | | 474/18 |
| 5,108,348 | A | * | 4/1992 | Bornmann | ........ | F16H 61/66272 |
| | | | | | | 474/18 |

(Continued)

OTHER PUBLICATIONS

U.S. Appl. No. 15/171,110, filed Jun. 2, 2016, Truong et al.

*Primary Examiner* — Henry Y Liu (57) ABSTRACT

A switching valve control module selectively actuates a switching valve of a continuously variable transmission (CVT) either: (i) from a closed position to an open position; or (ii) from the open position to the closed position. The switching valve prevents and allows transmission fluid flow through a flow path between a transmission fluid pump and a pressure regulator valve of the CVT when the switching valve is in the closed position and the open position, respectively. An adjustment determination module determines a pressure adjustment when the switching valve actuates. A target pressure module determines a target pressure output from the pressure regulator valve. An adjusting module determines an adjusted target pressure based on the pressure adjustment and the target pressure. A regulator valve control module controls opening of the pressure regulator valve based on the adjusted target pressure.

20 Claims, 5 Drawing Sheets

(56) References Cited

U.S. PATENT DOCUMENTS

| | | | | |
|---|---|---|---|---|
| 5,342,246 A * | 8/1994 | Mori | F16H 61/0272 | 474/1 |
| 6,090,000 A * | 7/2000 | Senger | F16H 61/12 | 474/18 |
| 6,099,424 A * | 8/2000 | Tsai | F16H 61/662 | 474/12 |
| 6,179,739 B1 * | 1/2001 | Tsai | F16H 61/66272 | 474/12 |
| 6,290,620 B1 * | 9/2001 | Tsai | F16H 61/66272 | 474/12 |
| 6,364,802 B1 * | 4/2002 | Yi | F16H 61/143 | 475/120 |
| 6,428,445 B1 * | 8/2002 | Friedmann | F16H 57/0434 | 474/28 |
| 6,739,994 B1 * | 5/2004 | Van Rooij | F16H 61/0031 | 474/18 |
| 6,824,483 B1 * | 11/2004 | Van Der Laan | F16H 61/66272 | 474/18 |
| 6,835,147 B2 * | 12/2004 | Iwata | F16H 61/12 | 474/18 |
| 7,041,018 B2 * | 5/2006 | Ochiai | F16H 57/0434 | 474/18 |
| 7,074,144 B2 * | 7/2006 | Nobu | F16H 61/66272 | 474/18 |
| 7,104,907 B2 * | 9/2006 | Jozaki | F16H 61/66272 | 474/18 |
| 7,192,371 B2 * | 3/2007 | Yamamoto | F16H 61/66272 | 474/18 |
| 7,201,684 B2 * | 4/2007 | Nobu | F16H 61/14 | 474/28 |
| 7,229,372 B2 * | 6/2007 | Shimanaka | F16H 61/66272 | 474/18 |
| 7,677,997 B2 * | 3/2010 | Hiramatsu | F16H 55/56 | 137/112 |
| 7,931,551 B2 * | 4/2011 | Katou | F16H 61/66272 | 474/18 |
| 7,951,026 B2 * | 5/2011 | Soga | F16H 61/0021 | 474/28 |
| 7,993,225 B2 * | 8/2011 | Ogata | F16H 61/12 | 474/28 |
| 8,012,051 B2 * | 9/2011 | Soga | F16H 61/12 | 474/110 |
| 8,038,553 B2 * | 10/2011 | Soga | F16H 61/66272 | 474/18 |
| 8,066,595 B2 * | 11/2011 | Ogata | F16H 61/0021 | 474/103 |
| 8,517,871 B2 * | 8/2013 | Ogata | F16H 61/66272 | 474/18 |
| 9,068,648 B2 * | 6/2015 | Moehlmann | F16H 61/0021 | |
| 9,441,733 B2 * | 9/2016 | Takahashi | F16H 59/20 | |
| 2006/0194671 A1 * | 8/2006 | Katou | F16H 61/66272 | 477/46 |
| 2007/0082769 A1 * | 4/2007 | Nihei | F16H 61/0021 | 474/8 |
| 2007/0232423 A1 * | 10/2007 | Katou | F16H 61/66272 | 474/28 |
| 2009/0069131 A1 * | 3/2009 | Soga | F16H 61/66272 | 474/18 |
| 2009/0069146 A1 * | 3/2009 | Soga | F16H 61/12 | 476/3 |
| 2011/0067968 A1 * | 3/2011 | Hanyu | F16H 61/0206 | 192/3.29 |
| 2011/0073196 A1 * | 3/2011 | Ishikawa | F16H 61/0021 | 137/487.5 |
| 2015/0144207 A1 * | 5/2015 | Inagaki | F16H 61/00 | 137/487.5 |
| 2015/0184744 A1 * | 7/2015 | Inagawa | F16H 61/0025 | 474/28 |

* cited by examiner

TRANSMISSION FLUID PRESSURE CONTROL SYSTEMS AND METHODS FOR CONTINUOUSLY VARIABLE TRANSMISSIONS

CROSS-REFERENCE TO RELATED APPLICATIONS

This application is related to U.S. patent application Ser. No. 15/171,110 filed on Jun. 2, 2016. The disclosure of the above application is incorporated herein by reference in its entirety.

FIELD

The present disclosure relates to vehicle transmissions and more particularly to speed control systems and methods for controlling transmission fluid pressures within a continuously variable transmission.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An engine generates torque and outputs torque to a transmission. An automatic transmission of a vehicle may include a plurality of fluid controlled friction elements, such as clutches. A control module may engage and disengage the friction elements to establish different gear ratios (also called speed ratios) within the transmission.

The transmission includes a transmission fluid pump. The transmission fluid pump provides transmission fluid for applying the clutches of the transmissions, lubricating transmission components, and cooling transmission components. Some transmission fluid pumps are mechanically driven, such as by the engine. Other transmission fluid pumps are electrically driven.

SUMMARY

In a feature, a transmission fluid control system of a vehicle is described. A switching valve control module selectively actuates a switching valve of a continuously variable transmission (CVT) either: (i) from a closed position to an open position; or (ii) from the open position to the closed position. The switching valve prevents transmission fluid flow through a flow path between a transmission fluid pump and a pressure regulator valve of the CVT when the switching valve is in the closed position. The switching valve also directs transmission fluid back to the transmission fluid pump when the switching valve is in the closed position. The switching valve allows transmission fluid flow through the flow path when the switching valve is in the open position. An adjustment determination module determines a pressure adjustment when the switching valve actuates (i) from the closed position to the open position; or (ii) from the open position to the closed position. A target pressure module determines a target pressure output from the pressure regulator valve. An adjusting module determines an adjusted target pressure based on the pressure adjustment and the target pressure. A regulator valve control module controls opening of the pressure regulator valve based on the adjusted target pressure.

In further features, the transmission fluid pump further pumps transmission fluid to the pressure regulator valve through a second flow path both (i) when the switching valve is in the open position and (ii) when the switching valve is in the closed position.

In further features, the adjusting module sets the adjusted target pressure based on one of: (i) a product of the target pressure and the pressure adjustment; and (ii) a sum of the target pressure and the pressure adjustment.

In further features, the adjustment determination module sets the pressure adjustment to a predetermined value when the switching valve control module maintains the switching valve in the closed position and when the switching valve control module maintains the switching valve in the open position. The adjusting module sets the adjusted target pressure equal to the target pressure when the pressure adjustment is equal to the predetermined value.

In further features, the adjustment determination module increases the pressure adjustment relative to the predetermined value when the switching valve control module actuates the switching valve from (i) from the closed position to the open position; or (ii) from the open position to the closed position.

In further features, a second target pressure module determines a first target pressure of transmission fluid applied to a first pulley actuator and determines a second target pressure of transmission fluid applied to a second pulley actuator. The first pulley actuator is coupled to an input shaft of the CVT and expands and contracts based on a first pressure of the transmission fluid applied to the first pulley actuator. The second pulley actuator is coupled to an output shaft of the CVT and expands and contracts based on a second pressure of the transmission fluid applied to the second pulley actuator. One of (i) a belt and (ii) a chain encircles the first and second pulley actuators. The adjustment determination module determines the pressure adjustment based on a greater one of the first and second target pressures.

In further features, the second target pressure module determines the first and second target pressures based on a target ratio of rotation of the input shaft to rotation of the output shaft.

In further features, the switching valve control module actuates the switching valve from the closed position to the open position when a rate of change of the target ratio is greater than a first predetermined value and actuates the switching valve from the open position to the closed position when the rate of change of the target ratio is less than a second predetermined value.

In further features, the switching valve control module determines a transition rate based on the greater one of the first and second target pressures and, based on the transition rate, actuates the switching valve (i) from the closed position to the open position or (ii) from the open position to the closed position.

In further features, a first pulley valve control module controls opening of a first valve based on the first target pressure, wherein the first valve receives transmission fluid from the pressure regulator valve and controls transmission fluid flow to the first pulley actuator. A second pulley valve control module controls opening of a second valve based on the second target pressure, wherein the second valve receives transmission fluid from the pressure regulator valve and controls transmission fluid flow to the second pulley actuator.

In a feature, a transmission fluid control method for a vehicle is described. The transmission fluid control method includes selectively actuating a switching valve of a continuously variable transmission (CVT) either: (i) from a closed position to an open position; or (ii) from the open position to the closed position. The switching valve prevents transmission fluid flow through a flow path between a transmission fluid pump and a pressure regulator valve of the CVT when the switching valve is in the closed position. The switching valve also directs transmission fluid back to the transmission fluid pump when the switching valve is in the closed position. The switching valve allows transmission fluid flow through the flow path when the switching valve is in the open position. The transmission fluid control method further includes: determining a pressure adjustment when the switching valve actuates (i) from the closed position to the open position; or (ii) from the open position to the closed position; determining a target pressure output from the pressure regulator valve; determining an adjusted target pressure based on the pressure adjustment and the target pressure; and controlling opening of the pressure regulator valve based on the adjusted target pressure.

In further features, the transmission fluid pump further pumps transmission fluid to the pressure regulator valve through a second flow path both (i) when the switching valve is in the open position and (ii) when the switching valve is in the closed position.

In further features, determining the adjusted target pressure includes setting the adjusted target pressure based on one of: (i) a product of the target pressure and the pressure adjustment; and (ii) a sum of the target pressure and the pressure adjustment.

In further features: determining the pressure adjustment includes setting the pressure adjustment to a predetermined value when the switching valve is maintained in the closed position and when the switching valve is maintained in the open position; and determining the adjusted target pressure includes setting the adjusted target pressure equal to the target pressure when the pressure adjustment is equal to the predetermined value.

In further features, determining the pressure adjustment includes setting the pressure adjustment to a value that is greater than the predetermined value when the switching valve actuates from (i) from the closed position to the open position; or (ii) from the open position to the closed position.

In further features, the transmission fluid control method further includes: determining a first target pressure of transmission fluid applied to a first pulley actuator; determining a second target pressure of transmission fluid applied to a second pulley actuator, wherein the first pulley actuator is coupled to an input shaft of the CVT and expands and contracts based on a first pressure of the transmission fluid applied to the first pulley actuator, wherein the second pulley actuator is coupled to an output shaft of the CVT and expands and contracts based on a second pressure of the transmission fluid applied to the second pulley actuator, wherein one of (i) a belt and (ii) a chain encircles the first and second pulley actuators; and wherein determining the pressure adjustment includes determining the pressure adjustment based on a greater one of the first and second target pressures.

In further features, determining the first and second target pressures includes determining the first and second target pressures based on a target ratio of rotation of the input shaft to rotation of the output shaft.

In further features, actuating the switching valve includes: actuating the switching valve from the closed position to the open position when a rate of change of the target ratio is greater than a first predetermined value; and actuating the switching valve from the open position to the closed position when the rate of change of the target ratio is less than a second predetermined value.

In further features, the transmission fluid control method further includes: determining a transition rate based on the greater one of the first target pressure, the second target pressure, and the target line pressure; and, based on the transition rate, actuating the switching valve (i) from the closed position to the open position or (ii) from the open position to the closed position.

In further features, the transmission fluid control method further includes: controlling opening of a first valve based on the first target pressure, wherein the first valve receives transmission fluid from the pressure regulator valve and controls transmission fluid flow to the first pulley actuator; and controlling opening of a second valve based on the second target pressure, wherein the second valve receives transmission fluid from the pressure regulator valve and controls transmission fluid flow to the second pulley actuator.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An engine generates drive torque for a vehicle. A continuously variable transmission (CVT) transfers torque to one or more wheels of the vehicle. A transmission fluid pump pumps transmission fluid to a line pressure regulator valve via one transmission fluid path. The transmission fluid pump also pumps transmission fluid to a switching valve located in a second transmission fluid path between the transmission fluid pump and the line pressure regulator valve. The switching valve can open to provide a first transmission fluid flowrate to the line pressure regulator valve and can be closed to provide a portion (e.g., one-half) of the first transmission fluid flowrate to the line pressure regulator valve while the other portion is returned to the transmission pump suction. A fuel efficiency increase may be realized when the switching valve is closed due to the transmission fluid pump imposing a lesser load.

The CVT includes a primary pulley and a secondary pulley. The primary pulley is coupled to an input shaft, and the secondary pulley is coupled to an output shaft. Via the output shaft, torque is transferred to one or more wheels of the vehicle. A belt or chain encircles the primary and secondary pulleys.

The primary pulley includes a primary pulley actuator that expands and contracts based upon a transmission fluid pressure applied to the primary pulley actuator and centrifugal force. The secondary pulley includes a secondary pulley actuator that expands and contracts based upon a transmission fluid pressure applied to the secondary pulley actuator, centrifugal force, and a spring force. The primary and secondary pulley actuators vary a speed ratio between the input and output shafts of the CVT via the expansion and contraction.

The line pressure regulator valve provides transmission fluid for various actuators/functions of the CVT. For example, the line pressure regulator valve provides transmission fluid to the primary and secondary pulley actuators based on a target drive ratio and various transmission inputs.

Some conditions, such as a transition of the switching valve from closed to open or open to closed may cause a decrease in the output pressure of the line pressure regulator valve and a decrease in transmission fluid pressure applied to one or more of the pulley actuators. This may cause the belt or chain to slip.

According to the present disclosure, a valve control module opens the line pressure regulator valve to increase output pressure (relative to a target output pressure) before and, while, and for a predetermined period after the switching valve is transitioned from closed to open or open to closed. The valve control module may also a set rate at which the switching valve is transitioned from closed to open or open to closed. This may minimize or prevent pressure fluctuations in the output pressure of the line pressure regulator valve and/or the transmission fluid pressure applied to one or more of the pulley actuators during the transition.

Figure 1A:
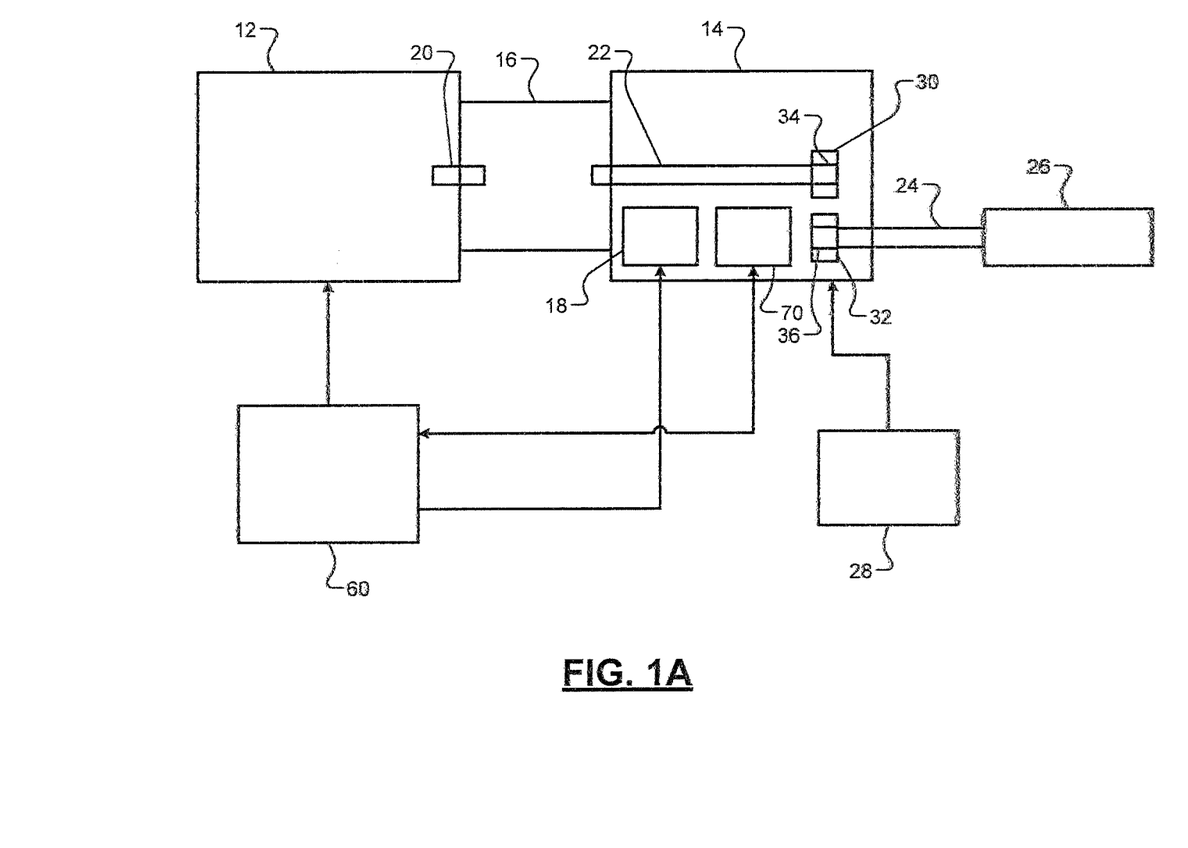
FIGS. 1A-1B are functional block diagrams of an example vehicle system.
Figure 1B:
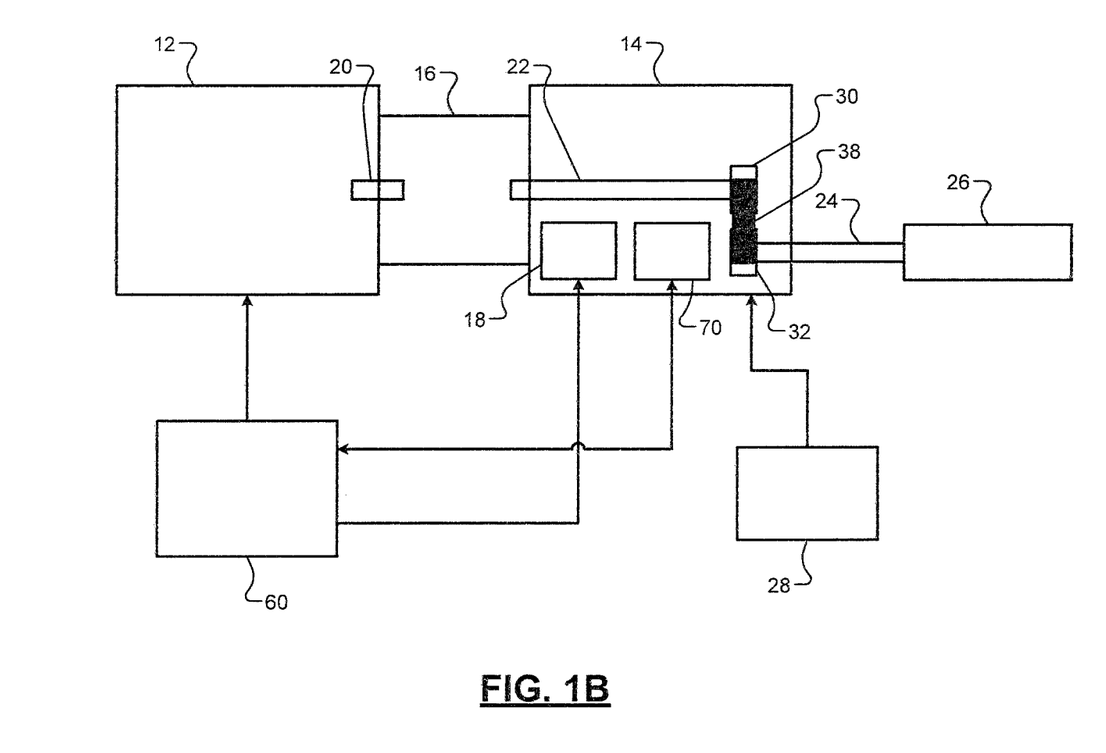

FIGS. 1A and 1B include functional block diagrams of an example vehicle system. An internal combustion engine 12 drives a transmission 14 via a torque converter 16. The engine 12 may include, for example, a spark-ignition engine, a compression-ignition engine, or another suitable type of engine. A vehicle may also include one or more electric motors and/or motor generator unit (MGUs), such as MGU 18.

The engine 12 outputs torque to the torque converter 16 via an engine output shaft 20, such as a crankshaft. The torque converter 16 supplies torque to the transmission 14 via a transmission input shaft 22. In some cases, the torque converter 16 may be omitted. The electric motor(s) and/or MGU(s) may also output torque to the transmission input shaft 22 to supplement or replace engine torque output. A MGU may convert mechanical energy into electrical energy under some circumstances, for example, to recharge one or more batteries and/or to supply power for electronic components of the vehicle.

The transmission 14 transfers torque between the transmission input shaft 22 and a transmission output shaft 24. A drive ratio may refer to or be based on the ratio between the rotational speed of the transmission input shaft 22 and the rotational speed of the transmission output shaft 24. The transmission output shaft 24 drives a driveline 26, and the driveline 26 transfers torque to wheels (not shown) of the vehicle. A range selector 28 enables a user to select a mode of operation of the transmission 14. The mode may include, for example, a park mode, a reverse mode, a neutral mode, or one or more forward drive modes.

The transmission 14 is a continuously variable transmission (CVT). A primary pulley 30 is coupled to and rotates with the transmission input shaft 22. A secondary pulley 32 is coupled to and rotates with the transmission output shaft 24. The primary pulley 30 includes a primary pulley actuator 34 that expands and contracts based on a pressure of transmission fluid applied to the primary pulley actuator 34. The secondary pulley 32 includes a secondary pulley actuator 36 that expands and contracts based on a pressure of transmission fluid applied to the secondary pulley actuator 36. While the example of the primary pulley 30 being directly coupled to the transmission input shaft 22 is provided, the primary pulley 30 may be indirectly coupled to the transmission input shaft 22 via one or more torque transfer devices. Also, while the example of the secondary pulley 32 being directly coupled to the transmission output shaft 24 is provided, the secondary pulley 32 may be indirectly coupled to the transmission output shaft 24 via one or more torque transfer devices.

As shown in FIG. 1B, a belt or chain 38 encircles the primary and secondary pulleys 30 and 32 to link rotation of the transmission input shaft 22 and the transmission output shaft 24. Expansion and contraction of the primary and secondary pulley actuators 34 and 36 vary the rotation ratio between the transmission input shaft 22 and the transmission output shaft 24.

An engine control module (ECM) 60 controls operation of the engine 12. The ECM 60 or another control module (not shown) may control operation of one or more electric motors and/or MGUs in various implementations. A transmission control module (TCM) 70 controls operation of the transmission 14. While the TCM 70 is shown as being implemented within the transmission 14, the TCM 70 may be implemented externally to the transmission 14 in various implementations. The ECM 60 and the TCM 70 may share data.

Figure 2:
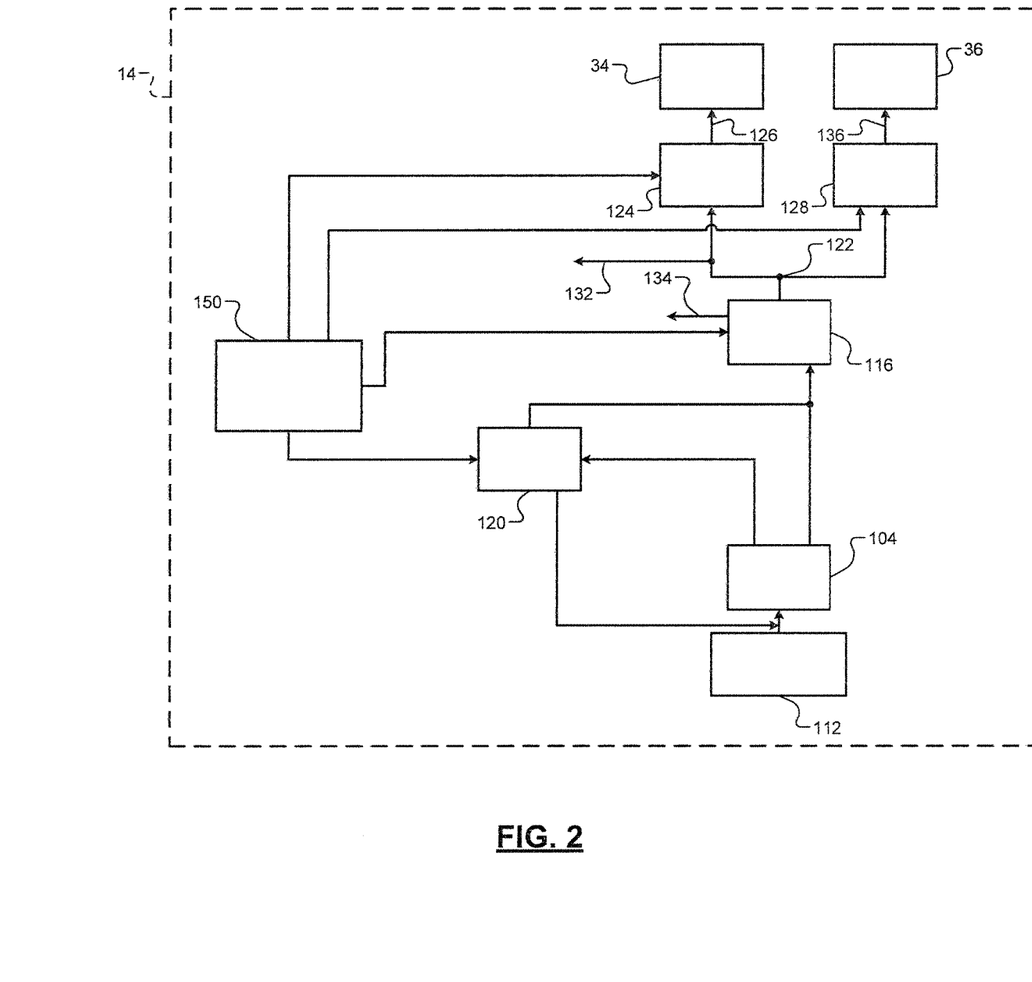
FIG. 2 is a functional block diagram of an example continuously variable transmission (CVT) system.

Referring now to FIG. 2, a functional block diagram of an example implementation of a CVT system is presented. The CVT 14 includes a transmission fluid pump 104 that draws transmission fluid from a sump 112 or another suitable transmission fluid source. The transmission fluid pump 104 is mechanically driven by the engine 12, such as by rotation of the crankshaft 20 or the transmission input shaft 22.

The transmission fluid pump 104 outputs the transmission fluid to a pressure regulator valve 116 via a first fluid path. The transmission fluid pump 104 also outputs the transmission fluid to a switching valve 120 via a second fluid path. When the switching valve 120 is open, the transmission fluid flows from the transmission fluid pump 104 through the switching valve 120 to the pressure regulator valve 116. In various implementations, the switching valve 120 may be integrated within the transmission fluid pump 104. When the switching valve 120 is closed, the second fluid path is connected back to pump suction.

The pressure regulator valve 116 regulates the flow and/or pressure of the transmission fluid to a primary pulley valve 124, a secondary pulley valve 128, and/or for one or more other actuators/functions 132. The pressure regulator valve also regulates flow and/or pressure of transmission fluid output for other actuators/functions 134 via a separate fluid path. The other actuators and/or functions 132 and 134 may include, for example, the torque converter 16 (e.g., clutch), forward/reverse clutches, one or more variable bleed solenoid (VBS) valves or variable force solenoids (VFS) that regulate transmission fluid flow and pressure to the various valves and components, cooling of the CVT 14, and/or lubrication of components of the CVT 14. One output pressure of the pressure regulator valve 116 may be referred to as a line pressure 122.

The primary pulley valve 124 regulates the flow (and pressure) of the transmission fluid to the primary pulley actuator 34. For example, the primary pulley valve 124 may be opened to increase the flow/pressure of the transmission fluid to the primary pulley actuator 34 and expand the primary pulley actuator 34. The primary pulley valve 124 may be closed to decrease the flow/pressure of the transmission fluid to the primary pulley actuator 34 and contract the primary pulley actuator 34. An output pressure of the primary pulley valve 124 may be referred to as a primary pulley pressure 126

The secondary pulley valve 128 regulates the flow (and pressure) of the transmission fluid to the secondary pulley actuator 36. For example, the secondary pulley valve 128 may be opened to increase the flow of the transmission fluid to the secondary pulley actuator 36 and expand the secondary pulley actuator 36. The secondary pulley valve 128 may be closed to decrease the flow of the transmission fluid to the secondary pulley actuator 36 and contract the secondary pulley actuator 36. An output pressure of the secondary pulley valve 128 may be referred to as a secondary pulley pressure 136. Respective VBS or VFS valves (not shown) may be used, for example, to control the flow/pressure of the transmission fluid from the switching valve 120, primary and secondary pulley valves 124 and 128, and pressure regulator valve 116.

A fluid control module 150 controls actuation of the switching valve 120, the pressure regulator valve 116, the primary pulley valve 124, and the secondary pulley valve 128. Generally speaking, the fluid control module 150 actuates the switching valve 120 to one of two discrete positions at a given time: an open position; or a closed position. The fluid control module 150 transitions the switching valve 120 between the two discrete positions under some circumstances.

When the switching valve 120 is in the closed position, the transmission fluid pump 104 operates in a partial (e.g., half) mode operation. The switching valve 120 blocks transmission fluid flow through the second fluid path when in the closed position and connects the second path to pump suction, so the transmission fluid pump 104 pumps transmission fluid to the pressure regulator valve 116 only through the first fluid path. Since the transmission fluid pump 104 is driven by the engine 12, a fuel efficiency increase (i.e., a fuel consumption decrease) of the engine 12 may be realized (relative to full mode operation) during operation in the partial mode as the transmission fluid pump 104 imposes a lesser torque load on the engine 12.

When the switching valve 120 is in the open position, the transmission fluid pump 104 operates in a full mode operation. The switching valve 120 enables transmission fluid flow through the second fluid path when in the open position, so the transmission fluid pump 104 pumps transmission fluid to the pressure regulator valve 116 through both of the first and second fluid paths.

The fluid control module 150 may transition the switching valve 120 from the closed position to the open position or from the open position to the closed position, under various circumstances. For example only, the fluid control module 150 may transition the switching valve 120 from the closed position to the open position when a rate of change of the target ratio between the input and output shafts 22 and 24 is greater than a predetermined value. The fluid control module 150 may transition the switching valve 120 from the open position to the closed position when a rate of change of the target ratio between the input and output shafts 22 and 24 is less than a predetermined value.

Figure 3:
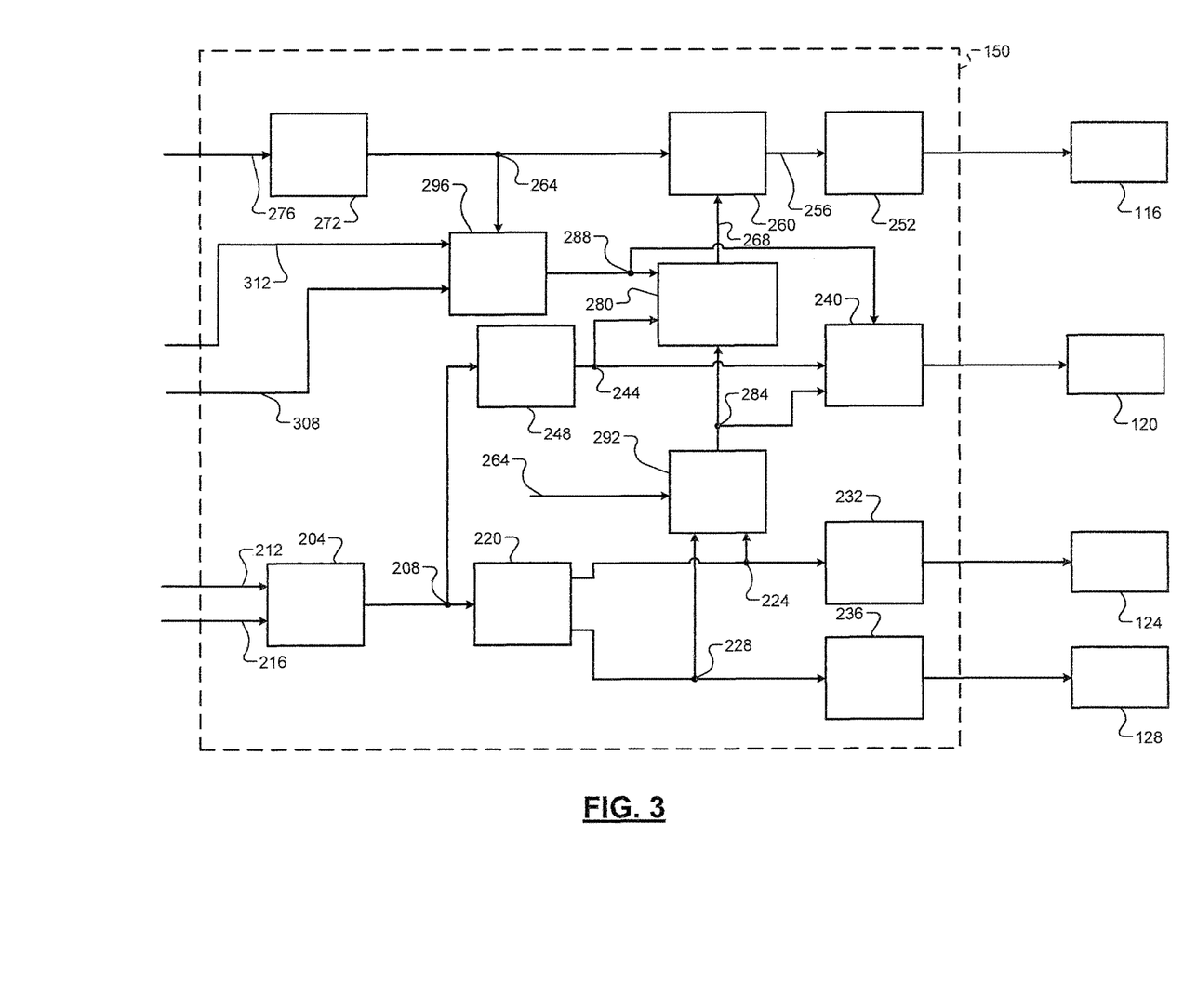
FIG. 3 is a functional block diagram of an example transmission fluid control system.

Referring now to FIG. 3, a functional block diagram of an example transmission fluid control system is presented. The fluid control module 150 may be implemented independently, within the TCM 70, or within another suitable module.

A target ratio module 204 determines a target ratio (between the input and output shafts 22 and 24) and a target rate of change 208 of the target ratio to be achieved using the primary and secondary pulley actuators 34 and 36. The target ratio module 204 may determine the target ratio and the target rate of change 208 of the target ratio, for example, based on an accelerator pedal position (APP) 212, a vehicle speed 216, and/or one or more other suitable parameters. The target ratio module 204 may determine the target ratio and the target rate of change 208 of the target ratio, for example, using one or more lookup tables or functions that relate the APP 212 and the vehicle speed 216 to the target ratio and to the target rate of change 208 of the target ratio.

A first target pressure module 220 determines a target primary pulley pressure 224 and a target secondary pulley pressure 228 based on the target ratio and the target rate of change 208 of the target ratio. The target primary pulley pressure 224 corresponds to a target value of the primary pulley pressure 126. The target secondary pulley pressure 228 corresponds to a target value of the secondary pulley pressure 136. The first target pressure module 220 may determine the target primary pulley pressure 224 and the target secondary pulley pressure 228, for example, using one or more look up tables or functions that relate the target ratio and/or the target rate of change 208 of the target ratio to the target primary pulley pressure 224 and the target secondary pulley pressure 228.

A primary valve control module 232 controls opening of the primary pulley valve 124 based on the target primary pulley pressure 224. The primary valve control module 232 may control the opening of the primary pulley valve 124, for example, in closed loop based on a difference between the target primary pulley pressure 224 and a measured or estimated value of the primary pulley pressure 126. For example, the primary valve control module 232 may open the primary pulley valve 124 as the target primary pulley pressure 224 increases, and vice versa, under some circumstances.

A secondary valve control module 236 controls opening of the secondary pulley valve 128 based on the target secondary pulley pressure 228. The secondary valve control module 236 may control the opening of the secondary pulley valve 128, for example, in closed loop based on a difference between the target secondary pulley pressure 228 and a measured or estimated value of the secondary pulley pressure 136. For example, the secondary valve control module 236 may open the secondary pulley valve 128 as the target secondary pulley pressure 228 increases, and vice versa, under some circumstances.

A switching valve control module 240 controls actuation of the switching valve 120. As stated above, the switching valve 120 is operated in one of the open position and the closed position. The switching valve control module 240 selectively transitions the switching valve 120 from the open position to the closed position and from the closed position to the open position.

For example, the switching valve control module 240 may transition the switching valve 120 from the closed position to the open position when a transition signal 244 is generated. A transition module 248 may generate the transition signal 244 for transitioning from the closed position to the open position, for example, when the target rate of change 208 of the target ratio is greater than a predetermined amount and/or when one or more other predetermined conditions are satisfied. The switching valve control module 240 may also transition the switching valve 120 from the open position to the closed position when the transition signal 244 is generated. The transition module 248 may also generate the transition signal 244 for transitioning from the open position to the closed position, for example, when the target rate of change 208 of the target ratio is less than a predetermined amount and/or when one or more other predetermined conditions are satisfied.

A regulator valve control module 252 controls opening of the pressure regulator valve 116 based on an adjusted target line pressure 256. The adjusted target line pressure 256 corresponds to a target value of the line pressure 122. For example, the regulator valve control module 252 may open the pressure regulator valve 116 as the adjusted target line pressure 256 increases, and vice versa, under some circumstances.

An adjusting module 260 adjusts a target line pressure 264 based on a pressure adjustment 268 to produce the adjusted target line pressure 256. The adjusting module 260 may, for example, set the adjusted target line pressure 256 equal to or based on a sum or a product of (a) the target line pressure 264 and (b) the pressure adjustment 268.

A second target pressure module 272 determines the target line pressure 264. For example, the second target pressure module 272 may receive one or more target line pressure requests 276 and set the target line pressure 264 equal to or based on a greatest (maximum) one of the target line pressure requests 276. Target line pressure requests may be generated for various reasons and actuators. For example, a target line pressure request may be generated for achieving the target ratio, controlling the torque converter clutch, lubrication, and/or cooling.

An adjustment determination module 280 determines the pressure adjustment 268. The adjustment determination module 280 may set the pressure adjustment 268 to a predetermined value when the transition signal 244 is not generated. The adjusting module 260 sets the adjusted target line pressure 256 equal to the target line pressure 264 when the pressure adjustment 268 is set to the predetermined value. For example, the predetermined value may be 0.0 in the example of the adjusting module 260 setting the adjusted target line pressure 256 equal to a sum of the target line pressure 264 and the pressure adjustment 268. In the example of the adjusting module 260 setting the adjusted target line pressure 256 equal to a product of the target line pressure 264 and the pressure adjustment 268, the predetermined value may be 1.0.

When the transition signal 244 is generated, the adjustment determination module 280 determines the pressure adjustment 268 based on a maximum target pressure 284. More specifically, when the transition signal 244 is generated and a state signal 288 is in a first state, the adjustment determination module 280 determines the pressure adjustment 268 based on the maximum target pressure 284 using a first lookup table. The first lookup table relates maximum target pressures to pressure adjustments. When the transition signal 244 is generated and the state signal 288 is in a second state, the adjustment determination module 280 determines the pressure adjustment 268 based on the maximum target pressure 284 using a second lookup table. The second lookup table also relates maximum target pressures to pressure adjustments.

The pressure adjustments of the second lookup table may be greater than the pressure adjustments of the first lookup table corresponding to given maximum target pressures. In this manner, at a given maximum target pressure 284, the pressure adjustment 268 may be greater when the state signal 288 is in the second state than when the state signal 288 is in the first state.

A maximum module 292 determines the maximum target pressure 284 based on the target primary pulley pressure 224, the target secondary pulley pressure 228, and the target line pressure 264. For example, the maximum module 292 may set the maximum target pressure 284 equal to or based on a greatest (maximum) one of the target primary pulley pressure 224, the target secondary pulley pressure 228, and the target line pressure 264.

A state module 296 generates the state signal 288. The state module 296 sets the state signal 288 to the first state when the transmission fluid pump 104 (via the pressure regulator valve 116) is delivering a maximum amount of transmission fluid for lubrication, (e.g., via 134) under the current operating conditions. In this condition the line pressure regulator valve 116 is also directing excess flow back to the transmission fluid pump 104. The state module 296 may set the state signal 288 to the second state when the pressure regulator valve 116 is limiting (i.e., delivering less than the maximum) flow for lubrication under the current operating conditions. In this case, the pressure regulator valve 116 is not directing excess flow back to the transmission sump 112. While the example of two states based on whether or not the maximum amount of fluid is being delivered is, in various implementations, there may be multiple states for situations between the extremes.

The current operating conditions may include, for example, an indicator 308 of whether the switching valve 120 is in the open position or the closed position, a speed 312 of the transmission fluid pump 104, and/or one or more other operating conditions. In the case of the transmission fluid pump 104 being a variable displacement pump which switches between 2 effective displacements, the current operating conditions may also include a displacement of the transmission fluid pump 104. The maximum pressure module 304 may determine the maximum line pressure 300, for example, one or more functions and/or lookup tables that relate the current operating conditions to maximum line pressures.

As stated above, the switching valve control module 240 transitions the switching valve 120 from the closed position to the open position or from the open position to the closed position when the transition signal 244 is generated. The switching valve control module 240 determines a rate at which to transition the switching valve 120 from the closed position to the open position or from the open position to the closed position based on the maximum target pressure 284. More specifically, when the transition signal 244 is generated and the state signal 288 is in the first state, the switching valve control module 240 determines the rate to transition the switching valve 120 based on the maximum target pressure 284 using a third lookup table. The third lookup table relates maximum target pressures to transition rates. In various implementations, one third lookup table may be used for closed to open transitions and another third lookup table may be used for open to closed transitions. When the transition signal 244 is generated and the state signal 288 is in the second state, the switching valve control module 240 determines the rate to transition the switching valve 120 based on the maximum target pressure 284 using a fourth lookup table. The fourth lookup table also relates maximum target pressures to transition rates. In various implementations, one fourth lookup table may be used for closed to open transitions and another fourth lookup table may be used for open to closed transitions.

The transition rates of the fourth lookup table may be greater than the transition rates of the third lookup table corresponding to given maximum target pressures. In this manner, at a given maximum target pressure 284, the transition rate used to transition the switching valve 120 from the closed position to the open position or from the open position to the closed position may be greater (faster) when the state signal 288 is in the second state than when the state signal 288 is in the first state.

Increasing the target line pressure 264 based on the pressure adjustment 268 and/or controlling the transition rate of the switching valve 120 may minimize changes (e.g., decreases) in the line pressure 122, the primary pulley pressure 126, and/or the secondary pulley pressure 136 attributable to the transition. This may minimize or prevent slippage of the belt or chain 38 and minimize or prevent changes in the ratio achieved by the primary and secondary pulley actuators 34 and 36.

Figure 4:
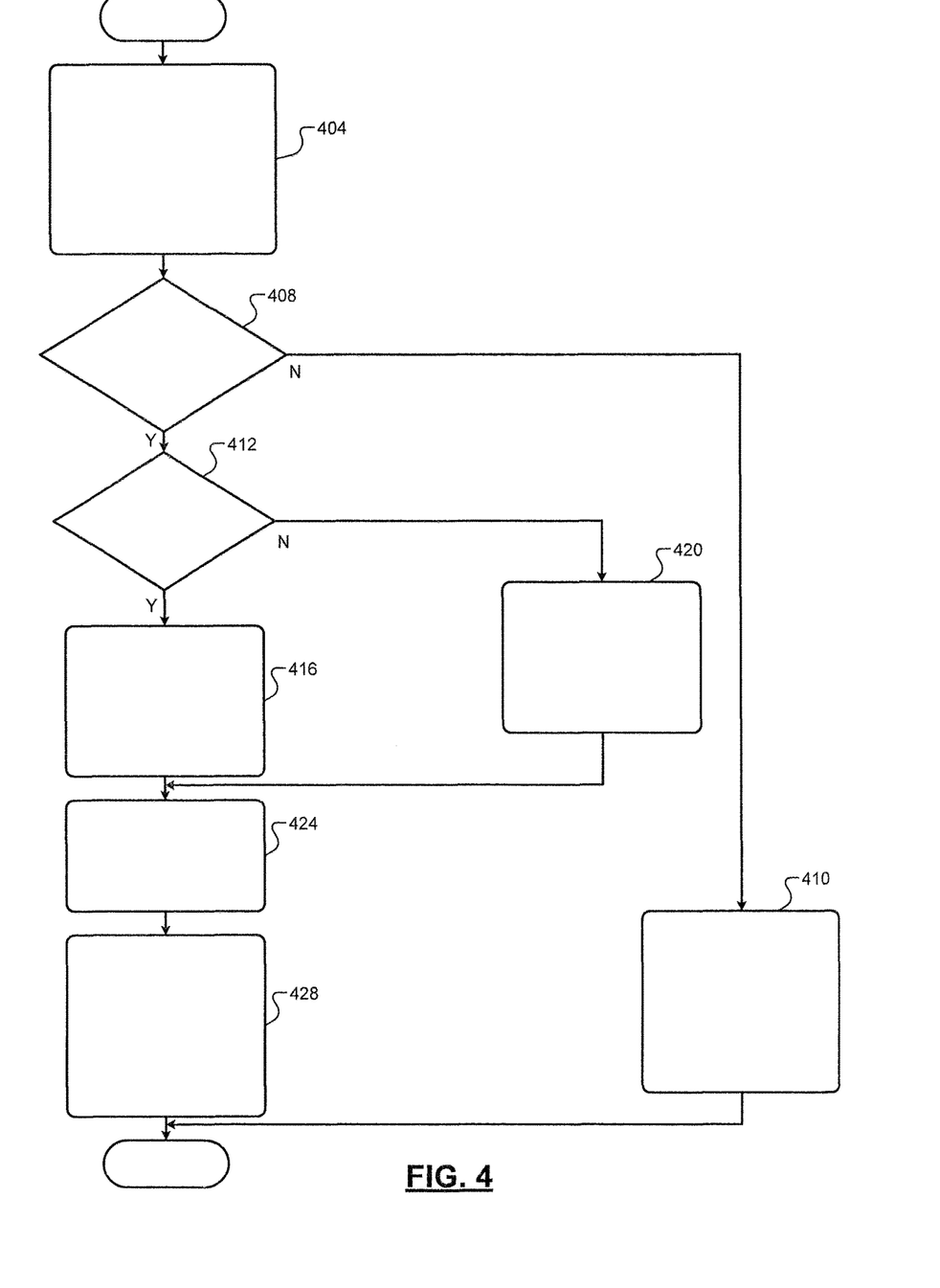
FIG. 4 is a flowchart depicting an example method of controlling valves of a CVT for a transition of a switching valve from a closed position to an open position or from the closed position to the open position.

Referring now to FIG. 4, a flowchart depicting an example method of controlling valves of the CVT 14 for a transition of the switching valve 120 from the closed position to the open position or the open position to the closed position is presented. Control begins with 404 when the switching valve 120 is in either the closed position or the open position.

At 404, the second target pressure module 272 determines the target line pressure 264 and the target ratio module 204 determines the target ratio and the target rate of change 208 of the target ratio. The first target pressure module 220 determines the target primary and secondary pulley pressures 224 and 228 based on the target ratio and the target rate of change 208 of the target ratio. The state module 296 sets the state signal to one of the first state and the second state at 404. The maximum module 292 also determines the maximum target pressure 284 at 404.

At 408, the transition module 248 determines whether the switching valve 120 should be transitioned from the closed position to the open position or from the open position to the closed position. If 408 is false, the transition module 248 does not generate the transition signal 244, and control continues with 410. The switching valve control module 240 maintains the switching valve 120 in the closed or open position at 410. The adjustment determination module 280 may therefore set the pressure adjustment 268 equal to the predetermined value such that the adjusted target line pressure 256 will be set equal to the target line pressure 264. The regulator valve control module 252 controls the pressure regulator valve 116 based on the adjusted target line pressure 256, the primary valve control module 232 controls the primary pulley valve 124 based on the target primary pulley pressure 224, and the secondary valve control module 236 controls the secondary pulley valve 128 based on the target secondary pulley pressure 228. If 408 is true, the transition module 248 generates the transition signal 244, and control continues with 412. The transition module 248 may continue generating the transition signal 244 until the switching valve 120 reaches the open position or the closed position.

The switching valve control module 240 and the adjustment determination module 280 determine whether the state signal 288 is in the first state at 412. If 412 is true, control continues with 416. The switching valve control module 240 determines the transition rate for transitioning the switching valve 120 from the closed position to the open position or from the open position to the closed position using the third lookup table based on the maximum target pressure 284 at 416. The adjustment determination module 280 determines the pressure adjustment 268 using the first lookup table based on the maximum target pressure 284 at 416. Control then continues with 424.

If 412 is false, control continues with 420. The switching valve control module 240 determines the transition rate for transitioning the switching valve 120 from the closed position to the open position or from the open position to the closed position using the fourth lookup table based on the maximum target pressure 284 at 420. The adjustment determination module 280 determines the pressure adjustment 268 using the second lookup table based on the maximum target pressure 284 at 420. Control continues with 424.

At 424, the adjusting module 260 increases the target line pressure 264 based on the pressure adjustment 268 to produce the adjusted target line pressure 256. At 428, the regulator valve control module 252 controls the pressure regulator valve 116 based on the adjusted target line pressure 256. The switching valve control module 240 transitions the switching valve 120 toward to the open position or the closed position at the transition rate at 428. Also, the primary valve control module 232 controls the primary pulley valve 124 based on the target primary pulley pressure 224, and the secondary valve control module 236 controls the secondary pulley valve 128 based on the target secondary pulley pressure 228.

The pressure adjustment 268, the maximum target pressure 284, the transition rate, the target primary pulley pressure 224, the target secondary pulley pressure 228, and the target ratio, the target rate of change 208 of the target ratio, the target line pressure 264, and/or one or more other parameters may be updated/determined on one or more instances while the switching valve control module 240 transitions the switching valve 120 from the closed position to the open position or from the open position to the closed position. The pressure regulator valve 116, the primary pulley valve 124, the secondary pulley valve 128 may accordingly be adjusted on one or more instances while the switching valve control module 240 transitions the switching valve 120. Control may end after 428 or 410. While the example of FIG. 4 is shown as ending, control may return to 404.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A transmission fluid control system of a vehicle, comprising:
   a switching valve control module that selectively actuates a switching valve of a continuously variable transmission (CVT) either: (i) from a closed position to an open position; or (ii) from the open position to the closed position,
   wherein, when the switching valve is in the closed position, the switching valve: prevents transmission fluid flow through a flow path between a transmission fluid pump and a pressure regulator valve of the CVT; and directs transmission fluid flow back to the transmission fluid pump, and
   wherein the switching valve allows transmission fluid flow through the flow path when the switching valve is in the open position;
   an adjustment determination module that determines a pressure adjustment when the switching valve actuates (i) from the closed position to the open position; or (ii) from the open position to the closed position;
   a target pressure module that determines a target pressure output from the pressure regulator valve;

an adjusting module that determines an adjusted target pressure based on the pressure adjustment and the target pressure; and a regulator valve control module that controls opening of the pressure regulator valve based on the adjusted target pressure.

2. The transmission fluid control system of claim 1 wherein the transmission fluid pump further pumps transmission fluid to the pressure regulator valve through a second flow path both (i) when the switching valve is in the open position and (ii) when the switching valve is in the closed position.

3. The transmission fluid control system of claim 1 wherein the adjusting module sets the adjusted target pressure based on one of: (i) a product of the target pressure and the pressure adjustment; and (ii) a sum of the target pressure and the pressure adjustment.

4. The transmission fluid control system of claim 1 wherein the adjustment determination module sets the pressure adjustment to a predetermined value when the switching valve control module maintains the switching valve in the closed position and when the switching valve control module maintains the switching valve in the open position, and wherein the adjusting module sets the adjusted target pressure equal to the target pressure when the pressure adjustment is equal to the predetermined value.

5. The transmission fluid control system of claim 4 wherein the adjustment determination module increases the pressure adjustment relative to the predetermined value when the switching valve control module actuates the switching valve from (i) from the closed position to the open position; or (ii) from the open position to the closed position.

6. The transmission fluid control system of claim 1 further comprising:

a second target pressure module that determines a first target pressure of transmission fluid applied to a first pulley actuator and that determines a second target pressure of transmission fluid applied to a second pulley actuator, wherein the first pulley actuator is coupled to an input shaft of the CVT and expands and contracts based on a first pressure of the transmission fluid applied to the first pulley actuator, wherein the second pulley actuator is coupled to an output shaft of the CVT and expands and contracts based on a second pressure of the transmission fluid applied to the second pulley actuator, and wherein one of (i) a belt and (ii) a chain encircles the first and second pulley actuators; and the adjustment determination module determines the pressure adjustment based on a greater one of the first target pressure, the second target pressure, and a target line pressure.

7. The transmission fluid control system of claim 6 wherein the second target pressure module determines the first and second target pressures based on a target ratio of rotation of the input shaft to rotation of the output shaft.

8. The transmission fluid control system of claim 7 wherein the switching valve control module actuates the switching valve from the closed position to the open position when a target rate of change of in the target ratio is greater than a first predetermined value and actuates the switching valve from the open position to the closed position when the target rate of change of the target ratio is less than a second predetermined value.

9. The transmission fluid control system of claim 6 wherein the switching valve control module determines a transition rate based on the greater one of the first and second target pressures and, based on the transition rate, actuates the switching valve (i) from the closed position to the open position or (ii) from the open position to the closed position.

10. The transmission fluid control system of claim 6 further comprising:

a first pulley valve control module that controls opening of a first valve based on the first target pressure, wherein the first valve receives transmission fluid from the pressure regulator valve and controls transmission fluid flow to the first pulley actuator; and a second pulley valve control module that controls opening of a second valve based on the second target pressure, wherein the second valve receives transmission fluid from the pressure regulator valve and controls transmission fluid flow to the second pulley actuator.

11. A transmission fluid control method for a vehicle, comprising:

selectively actuating a switching valve of a continuously variable transmission (CVT) either: (i) from a closed position to an open position; or (ii) from the open position to the closed position, wherein, when the switching valve is in the closed position, the switching valve: prevents transmission fluid flow through a flow path between a transmission fluid pump and a pressure regulator valve of the CVT; and directs transmission fluid flow back to the transmission fluid pump, and wherein the switching valve allows transmission fluid flow through the flow path when the switching valve is in the open position;

determining a pressure adjustment when the switching valve actuates (i) from the closed position to the open position; or (ii) from the open position to the closed position;

determining a target pressure output from the pressure regulator valve;

determining an adjusted target pressure based on the pressure adjustment and the target pressure; and controlling opening of the pressure regulator valve based on the adjusted target pressure.

12. The transmission fluid control method of claim 11 wherein the transmission fluid pump further pumps transmission fluid to the pressure regulator valve through a second flow path both (i) when the switching valve is in the open position and (ii) when the switching valve is in the closed position.

13. The transmission fluid control method of claim 11 wherein determining the adjusted target pressure includes setting the adjusted target pressure based on one of: (i) a product of the target pressure and the pressure adjustment; and (ii) a sum of the target pressure and the pressure adjustment.

14. The transmission fluid control method of claim 11 wherein:

determining the pressure adjustment includes setting the pressure adjustment to a predetermined value when the switching valve is maintained in the closed position and when the switching valve is maintained in the open position; and determining the adjusted target pressure includes setting the adjusted target pressure equal to the target pressure when the pressure adjustment is equal to the predetermined value.

15. The transmission fluid control method of claim 14 wherein determining the pressure adjustment includes setting the pressure adjustment to a value that is greater than the predetermined value when the switching valve actuates from (i) from the closed position to the open position; or (ii) from the open position to the closed position.

16. The transmission fluid control method of claim 11 further comprising:
   determining a first target pressure of transmission fluid applied to a first pulley actuator;
   determining a second target pressure of transmission fluid applied to a second pulley actuator,
   wherein the first pulley actuator is coupled to an input shaft of the CVT and expands and contracts based on a first pressure of the transmission fluid applied to the first pulley actuator,
   wherein the second pulley actuator is coupled to an output shaft of the CVT and expands and contracts based on a second pressure of the transmission fluid applied to the second pulley actuator, and
   wherein one of (i) a belt and (ii) a chain encircles the first and second pulley actuators; and
   wherein determining the pressure adjustment includes determining the pressure adjustment based on a greater one of the first and second target pressures.

17. The transmission fluid control method of claim 16 wherein determining the first and second target pressures includes determining the first and second target pressures based on a target ratio of rotation of the input shaft to rotation of the output shaft.

18. The transmission fluid control method of claim 17 actuating the switching valve includes:
   actuating the switching valve from the closed position to the open position when a target rate of change of the target ratio is greater than a first predetermined value; and
   actuating the switching valve from the open position to the closed position when the target rate of change of the target ratio is less than a second predetermined value.

19. The transmission fluid control method of claim 16 further comprising:
   determining a transition rate based on the greater one of the first target pressure, the second target pressure, and a target line pressure; and,
   based on the transition rate, actuating the switching valve (i) from the closed position to the open position or (ii) from the open position to the closed position.

20. The transmission fluid control method of claim 16 further comprising:
   controlling opening of a first valve based on the first target pressure, wherein the first valve receives transmission fluid from the pressure regulator valve and controls transmission fluid flow to the first pulley actuator; and
   controlling opening of a second valve based on the second target pressure, wherein the second valve receives transmission fluid from the pressure regulator valve and controls transmission fluid flow to the second pulley actuator.

* * * * *